(12) United States Patent
Decker

(10) Patent No.: US 12,489,284 B2
(45) Date of Patent: Dec. 2, 2025

(54) BUSBAR ASSEMBLY AND CIRCUIT ASSEMBLY

(71) Applicant: Vitesco Technologies GmbH, Regensburg (DE)

(72) Inventor: Michael Decker, Munich (DE)

(73) Assignee: Vitesco Technologies GmbH, Regensburg (DE)

( * ) Notice: Subject to any disclaimer, the term of this patent is extended or adjusted under 35 U.S.C. 154(b) by 309 days.

(21) Appl. No.: 18/449,097

(22) Filed: Aug. 14, 2023

(65) Prior Publication Data

US 2024/0055847 A1  Feb. 15, 2024

(30) Foreign Application Priority Data

Aug. 12, 2022 (DE) ...................... 10 2022 208 416.0

(51) Int. Cl.
*H02G 5/10* (2006.01)
*H02G 5/06* (2006.01)

(52) U.S. Cl.
CPC ............... *H02G 5/10* (2013.01); *H02G 5/066* (2013.01)

(58) Field of Classification Search
CPC ............ H02G 5/04; H02G 5/066; H02G 5/10
See application file for complete search history.

(56) References Cited

U.S. PATENT DOCUMENTS

| | | | |
|---|---|---|---|
| 3,018,320 A | 1/1962 | Rowe | |
| 3,639,676 A * | 2/1972 | Dempsey, Jr | H02G 5/06 174/68.3 |
| 6,265,666 B1 | 7/2001 | Faulkner | |
| 8,134,070 B2 | 3/2012 | Hirschfeld | |
| 8,926,351 B2 | 1/2015 | O'Leary et al. | |
| 10,199,804 B2 | 2/2019 | Ramm et al. | |
| 2014/0141636 A1* | 5/2014 | O'Leary | H01R 25/162 439/213 |
| 2016/0028216 A1* | 1/2016 | Pal | H01H 85/47 361/676 |
| 2020/0336078 A1* | 10/2020 | Riou | H05K 7/20909 |
| 2021/0218237 A1 | 7/2021 | Dube | |
| 2022/0102955 A1 | 3/2022 | Dopadlo et al. | |
| 2022/0337039 A1* | 10/2022 | Dandl | H01R 13/005 |

FOREIGN PATENT DOCUMENTS

| | | |
|---|---|---|
| DE | 102006058327 B3 | 5/2008 |
| DE | 102018000284 A1 | 7/2018 |
| DE | 102019101973 A1 | 7/2020 |
| JP | 4552513 B2 | 9/2010 |

* cited by examiner

Primary Examiner — Timothy J Thompson
Assistant Examiner — Rhadames Alonzo Miller
(74) Attorney, Agent, or Firm — Laurence A. Greenberg; Werner H. Stemer; Ralph E. Locher

(57) ABSTRACT

A busbar assembly contains: an electrical busbar having two end faces, a bottom surface, a top surface, and two side faces connecting the bottom surface and the top surface, and a metallic busbar heatsink having a bottom wall and at least two cooling fins extending from the bottom wall. The cooling fins together with the bottom wall forming a receiving space for receiving the busbar and the busbar is arranged in the receiving space in such a manner that at least one of the two side faces of the busbar is in planar contact with one of the cooling fins.

16 Claims, 6 Drawing Sheets

BUSBAR ASSEMBLY AND CIRCUIT ASSEMBLY

CROSS-REFERENCE TO RELATED APPLICATION

This application claims the priority, under 35 U.S.C. § 119, of German Patent Application DE 10 2022 208 416.0, filed Aug. 12, 2022; the prior application is herewith incorporated by reference in its entirety.

FIELD AND BACKGROUND OF THE INVENTION

The present invention relates to a busbar assembly and a circuit assembly having such a busbar assembly.

In vehicles, and in particular in electrified vehicles, electrical currents typically need to be distributed. This is usually done in a current distributor. In battery-powered vehicles, such a current distributor may be, for example, a battery junction box. Such current distributors usually have electrical busbars installed in them, which specify the electrical conduction path between the components to be electrically connected. In contrast to standard electrical conductors, such busbars are usually configured as solid rails, the cable cross-section is matched to the typically high currents to be transmitted.

Due to the constantly increasing requirements with regard to the electrical currents to be transmitted, the following two challenges arise, among others. On the one hand, it is necessary to cool the busbar effectively, as the busbar can sometimes heat up strongly due to the electrical currents to be transmitted. On the other hand, the installation space in modern vehicles is limited. This means that one or more busbars must be arranged in a compact manner in a confined space without allowing electrical short circuits or overheating to occur.

SUMMARY OF THE INVENTION

The object of the present invention is therefore to provide a busbar assembly with which one or more busbars can be arranged in a compact manner and at the same time effectively cooled. It is also an object of the present invention to provide a circuit assembly having such a busbar assembly.

These objects are achieved by the independent patent claims. Further configurations of the present invention are the subject matter of the dependent claims.

In accordance with a further aspect of the invention, a busbar assembly is provided. It contains: at least one electrical busbar, wherein the busbar serves as a rigid electrical connection and has two end faces, a bottom surface, a top surface, and two side faces connecting the bottom surface and the top surface; and a metallic busbar heatsink having a bottom wall and a plurality of, in particular at least two, cooling fins extending from the bottom wall, wherein each two adjacent cooling fins together with the bottom wall form a substantially U-shaped or rectangular receiving space for receiving the busbar. According to the invention, the busbar is arranged in the receiving space in such a way that at least one of the two side surfaces of the busbar is in a planar contact with an associated cooling fin. The term "planar" contact in the context of this disclosure means that one of the two side surfaces is substantially in full-surface contact with a side face of the cooling fin, so that the cooling fin can cool the electrical busbar over the entire side surface. The term planar "contact" in the context of this disclosure is intended to include not only a direct contact between the side face of the busbar and the cooling fin, but also contact via layers that may be present between the cooling fin and the side face of the busbar, such as an insulation layer and/or a heat-conducting foil. In particular, in the metallic busbar heatsink the bottom wall runs substantially horizontally and the plurality of cooling fins, in any case at least two, run substantially vertically, so that the substantially rectangular receiving space described above is obtained between two adjacent cooling fins. In addition, the bottom and top surface of the electrical busbar are significantly smaller than the side faces. In other words, the electrical busbars as known to the person skilled in the art for such rigid electrical connections are, so to speak, strip-like and have a thickness of 1 mm to 3 mm, so that the currents to be transmitted can be transmitted safely, depending on the application.

The busbar assembly according to the invention is based at least partly on the recognition that the side face of the electrical busbar provides a comparatively large contact surface for cooling the electrical busbar if the side surface of the busbar is in planar contact with a heatsink. Heat dissipation via the side surface is inherently significantly more effective than heat dissipation via the top or bottom surface, which, as already mentioned, is significantly lower compared to the side faces in such busbars.

Furthermore, the busbar assembly according to the invention is based at least partially on the recognition that a compact busbar assembly, in particular for a plurality of electrical busbars, can be achieved by the busbar heatsink having a plurality of cooling fins which are arranged adjacent and parallel to each other. The busbar heatsink thus maintains a plurality of adjacent receiving spaces for adjacent busbars. This makes it possible that the respective electrical busbar can be effectively cooled via the respective side face by means of the associated cooling fin. Due to the adjacent arrangement of the plurality of cooling fins, an arrangement of a plurality of electrical busbars next to each other is also possible. Thus, the busbar assembly according to the invention not only makes it possible to effectively cool an electrical busbar, specifically via its side face, but also to accommodate a plurality of electrical busbars next to each other and thus in a particularly compact assembly.

In a preferred embodiment of the busbar assembly according to the invention, an electrical insulator is arranged between the cooling fin and the at least one side face of the busbar in contact with the cooling fin. In other words, there is contact between the side face of the busbar and the insulator on the one hand, and contact between the insulator and the side face of the cooling fin on the other. Since the busbar heatsink is metallic and therefore electrically conductive, an insulator is required if a plurality of electrical busbars are to be arranged on the metallic busbar heatsink. This allows not only a single electrical busbar, but also multiple electrical busbars to be cooled by means of a single busbar heatsink, each busbar being arranged in a receiving space of the same busbar heatsink associated with it.

In particular, it is advantageous if the insulator is formed from an electrically insulating polymer material applied at least to the cooling fins and optionally also to the bottom wall. This has advantages in particular in terms of production engineering. For example, in a first step, the metallic busbar heatsink with the plurality of cooling fins can be produced and in a second step, the heatsink can be coated with the electrically insulating polymer material so that the surfaces of the bottom wall and the side faces of the cooling fins are covered with an insulator.

In a further preferred embodiment, an air gap is present between the bottom surface of the busbar and the bottom wall of the busbar heatsink. The air gap acts in particular as tolerance compensation in the arrangement of the electrical busbar or busbars in the receiving space. This is because, as already mentioned, the electrical busbar is a comparatively rigid electrical conductor which cannot be bent without great effort. A planar contact between the cooling fin and one of the two side faces of the busbar can be more easily established using the air gap, since manufacturing tolerances in the busbar and/or the heatsink can be compensated by means of the air gap.

Another preferred embodiment provides that a heat-conducting foil is arranged between the cooling fin and the at least one side face of the busbar in contact with the cooling fin. If an insulator is present, the heat-conducting foil is particularly preferably arranged between the insulator and the side face of the busbar. However, it is not absolutely necessary to provide the insulator if there is only one electrical busbar present. In this case, the heat-conducting foil can certainly be arranged between the side face of the busbar and the cooling fins. However, it is also possible for the heat-conducting foil itself to be electrically insulating, which makes it not mandatory to provide an electrical insulator in the event that multiple busbars are to be arranged in the heatsink.

Another preferred embodiment provides that in the receiving space of the busbar heatsink a fixing element is arranged, which pushes the busbar laterally toward the associated cooling fin and fixes the busbar in its position relative to the cooling fin. The fixing element acts as an additional tolerance compensation.

It is particularly preferred, when an insulator is present between the busbar and the cooling fin, if the fixing element is integrated into the insulator or is molded onto it. This reduces the number of individual parts in the production of the busbar assembly.

It is particularly preferred if the fixing element is formed as a spring element applying a spring force, which is installed in the receiving space under pre-tension. Spring elements are characterized by their spring force. This can be used to push the busbar toward the cooling fin. The spring element can, for example, be attached to the cooling fin located opposite it by means of a retaining lug or the like. In particular, it is conceivable that, if an insulator is present, such a retaining lug is integrated in the insulator or is molded onto it.

Another preferred embodiment provides that the receiving space is filled with a potting compound. The potting compound improves the heat dissipation.

Another preferred embodiment provides that the bottom wall of the busbar heatsink is connected to a housing wall of a housing. The housing can be made of metal or an insulating plastic and may be part, for example, of the current distributor described above.

It is particularly preferable if the bottom wall has alignment slots for aligning the busbar heatsink relative to the housing wall. The alignment slots enable an advantageous and simple installation of the busbar assembly in a housing and/or attachment to a housing wall of the housing.

It is particularly advantageous if the housing wall is connected to a housing heatsink on one side facing away from the bottom wall. This ensures that heat can be dissipated from the busbar via the busbar heatsink and via the housing wall through to the external housing heatsink.

Another preferred embodiment provides that in the longitudinal extension direction, the longitudinal extension direction being the direction of the electrical conduction path of the busbar, the busbar has a curved, in particular arc-shaped, profile at least in some sections and the cooling fins of the busbar heatsink are matched to this at least partially curved profile. Due to the matched profiles of cooling fins of the busbar heatsink on the one hand and the busbar(s) on the other hand, a planar contact between the side face of the busbar and its associated cooling fin is also obtained in the longitudinal direction of the busbar. In addition, a current flow guide can be adapted to existing and predefined connection points, if present.

Another preferred embodiment provides that the busbar heatsink has a plurality of cooling fins, two of which each form a respective receiving space for a respective busbar, so that one busbar is arranged in each receiving space of the busbar heatsink in such a way that at least one of the two side faces of the respective busbar is in planar contact with a cooling fin associated with a respective busbar. This preferred embodiment then enables the arrangement of a plurality of busbars in the busbar assembly, as already described above.

It is particularly advantageous if the plurality of busbars in the heatsink are arranged next to each other and parallel to each other. This results in a particularly compact assembly with a small footprint.

In accordance with a second aspect of the present invention, a circuit assembly is provided. The circuit assembly includes: a first electrical component, for example a battery current distributor component, having one or more first electrical connection points; a second electrical component, for example a plug connector, having one or more second electrical connection points; and a busbar assembly according to the first aspect or embodiments thereof. The electrical busbar is electrically connected at a first busbar section to at least one of the first connection points and is electrically connected at a second busbar section to at least one of the second connection points. With the circuit assembly according to the invention according to the second aspect, one or more busbars can thus be installed between the two electrical components efficiently and for a small installation space, so that the electrical components can be electrically connected by means of the busbars.

Other features which are considered as characteristic for the invention are set forth in the appended claims.

Although the invention is illustrated and described herein as embodied in a busbar assembly and a circuit assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Elements with the same function or construction are provided with the same reference signs throughout the figures.

Figure 1:
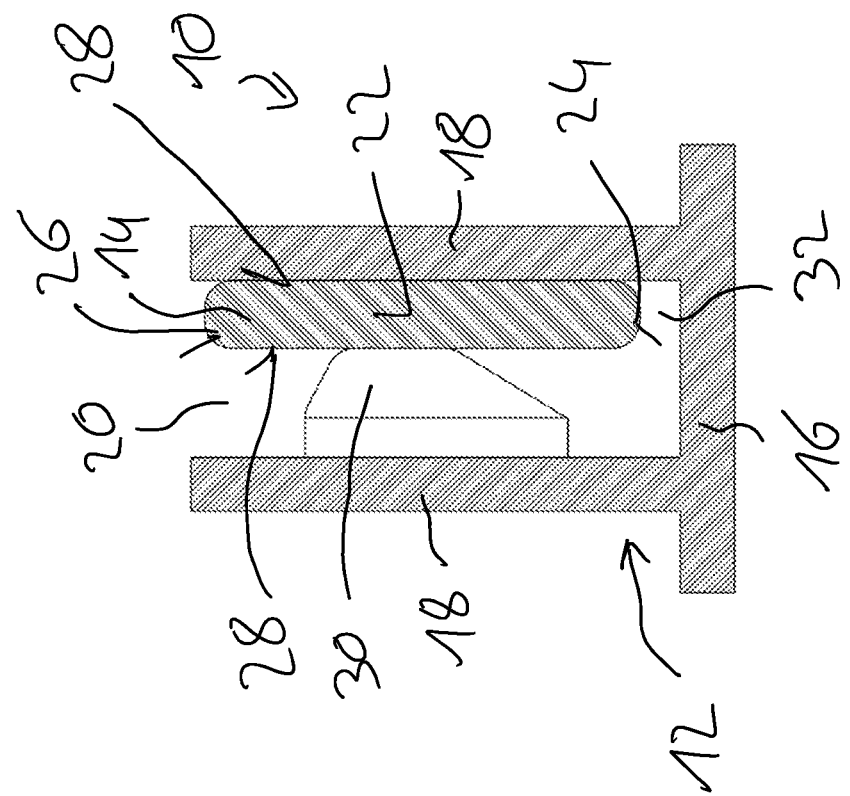
FIG. 1 is a diagrammatic, sectional view of an embodiment of the busbar assembly according to the invention having a single busbar.

Referring now to the figures of the drawings in detail and first, particularly to FIG. 1 thereof, there is shown a schematic sectional view through a busbar assembly 10 with a metallic busbar heatsink 12 and an electrical busbar 14.

The busbar heatsink 12 has a bottom wall 16 and in the specific example of FIG. 1 two cooling fins 18 connected to the bottom wall 16. In the specific example of FIG. 1, the bottom wall 16 extends substantially horizontally and the cooling fins 18 extend substantially vertically, so that the cooling fins 18 and the bottom wall 16 together form a substantially rectangular receiving space 20 for the busbar 14. In other words, in the longitudinal extension direction of the busbar 14, a kind of rectangular receiving channel is produced for the busbar 14.

In contrast to standard electrical conductors, the electrical busbar 14 is a strip-shaped, rigid electrical connection, as is commonly used in particular in battery-powered vehicles for the distribution of high electrical currents. The electrical busbar 14 has two end faces 22, of which one is shown in the sectional view of FIG. 1. The electrical busbar 14 further comprises a bottom surface 24, a top surface 26, and two side faces 28 connecting the bottom surface 24 to the top surface 26. The two side faces 28 are significantly larger than the bottom surface 24 or top surface 26, as is usually the case with a busbar 14 of this kind. For example, a typical thickness measured between the two opposite side faces 28 of the busbar 14 is in a range from 1 mm to 3 mm. For example, a typical height, measured between the bottom surface 24 and the top surface 26, of the busbar 14 is in a range from 5 mm to 30 mm.

The metallic busbar heatsink 12 is used for cooling the busbar 14. In order to cool the busbar 14 effectively, in the busbar assembly 10 according to the invention it is proposed that one of the two side faces 28 of the busbar 14 is in planar and thermally conducting contact with one of the two cooling fins 18. In the specific example of FIG. 1, the right-side face 28 of the busbar 14 contacts a left-side face of the right cooling fins 18. Since the busbar heatsink 12 is metallic and a planar contact exists between cooling fins 18 and busbar 14, it is possible to cool the busbar 14 effectively, namely over the entire width of the side face 28.

In order to improve the contact between the busbar 14 and the cooling fins 18 and to maintain it throughout the long service life of the assembly 10, a fixing element 30 is additionally located in the receiving space 20 of the busbar assembly 10. The fixing element 30 pushes the busbar 14 toward the right cooling fins 18 and fixes the busbar 14 in its position within the receiving space 20 or relative to the cooling fin 18. The fixing element 30 can be shaped in any desired manner. In the specific example of FIG. 1, the fixing element 30 is a separate fixing element and arranged in the receiving space 20, which on the one hand is fixed to the left cooling fin 18 and on the other hand presses on the busbar 14 with the right side. A wide variety of designs in form and materials are conceivable.

As further shown in FIG. 1, an air gap is located between the bottom surface 24 of the busbar 14 and the bottom wall 16 of the busbar heatsink 12, which is indicated by the reference sign 32. The air gap 32 brings advantages during installation of the busbar 14 and can be used as tolerance compensation when mounting the busbar 14 in the busbar heatsink 12.

Figure 2:
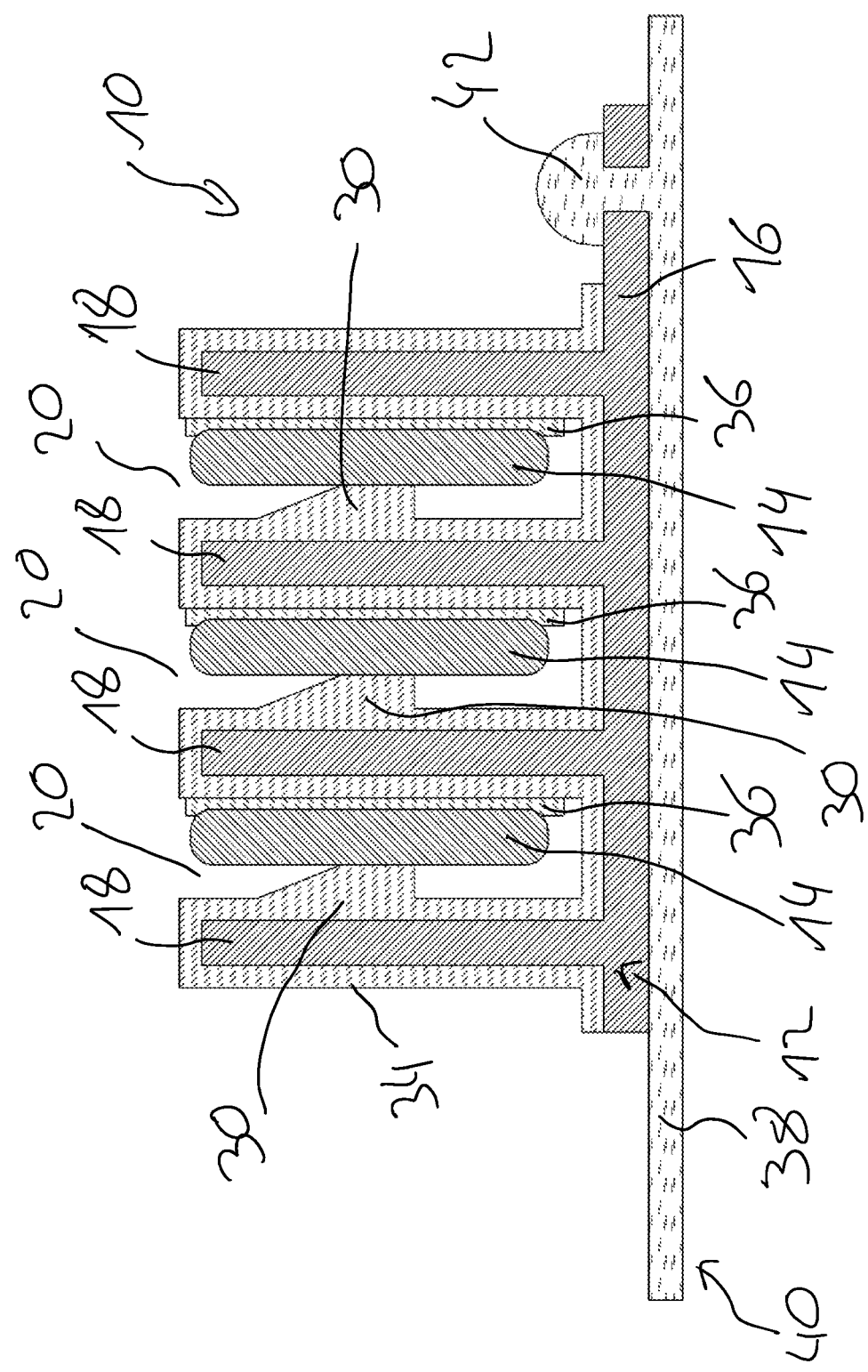
FIG. 2 is a diagrammatic, sectional view of a further embodiment of the busbar assembly according to the invention having a plurality of busbars arranged adjacent to each other and an insulator surrounding the metallic cooling fin.

Reference will now to be made to FIG. 2.

In contrast to the busbar assembly of FIG. 1, the busbar heatsink 12 of the busbar assembly 10 of FIG. 2 has more than two cooling fins 18. In the specific example of FIG. 2, four cooling fins 18 are shown. The cooling fins 18 are arranged next to each other, run essentially vertically and are arranged on the common bottom wall 16 of the busbar heatsink 12. Two adjacent cooling fins 18 each form a receiving space 20 for receiving a respective busbar 14. In the busbar assembly 10 of FIG. 2, by way of example, three busbars 14 are arranged in parallel and adjacent, wherein each busbar 14 is arranged in a respective receiving space 20. However, it is not mandatory that each receiving space 20 has a busbar 14.

Since the busbar heatsink 12 is a metallic heatsink, it is essential that no electrical short circuit occurs between the busbars 14. For this reason, the cooling fins 18 in particular are coated with an electrical insulator 34. In the specific example of FIG. 2, the electrical insulator 34 is a polymer material applied to the cooling fins 18 and in the specific example of FIG. 2 also to the bottom wall 16, which has an electrically insulating effect. The electrical insulator 34 prevents an electrical short circuit to an adjacent busbar 14 from being effected by a contact of the busbar 14 with the cooling fin 18.

As further shown in FIG. 2, a fixing element 30 is integrated into the electrical insulator 34 or molded to it in such a way that the fixing element 30 or the corresponding portion of the insulator 34 presses the respective busbar 14 toward the associated cooling fin 18.

In the specific example of FIG. 2, a thermally conducting foil 36 is also present between each busbar 14 and a cooling fin 18 associated with it. The heat-conducting foil 36 improves the thermal contact between the busbar 14 and the cooling fin 18. In another embodiment, not shown, the heat-conducting foil 36 is also integrated into the insulator 34. However, it is also possible that instead of the insulator 34, only the heat-conducting foil 36 is present, which must then be designed as an electrical insulator if a plurality of busbars 14 are arranged in the busbar heatsink 12, in order to prevent the already mentioned short circuit between the busbars 14.

As further shown in FIG. 2, the bottom wall 16 of the busbar heatsink 12 is connected to a housing wall 38 of a housing 40, an excerpt of which is shown in FIG. 2. The housing 40 may be a housing of a current distributor in which the busbar assembly 10 is arranged.

In the specific example of FIG. 2, the bottom wall 16 is also connected to the housing wall 38 by means of a heat-caulked pin 42.

Figure 3:
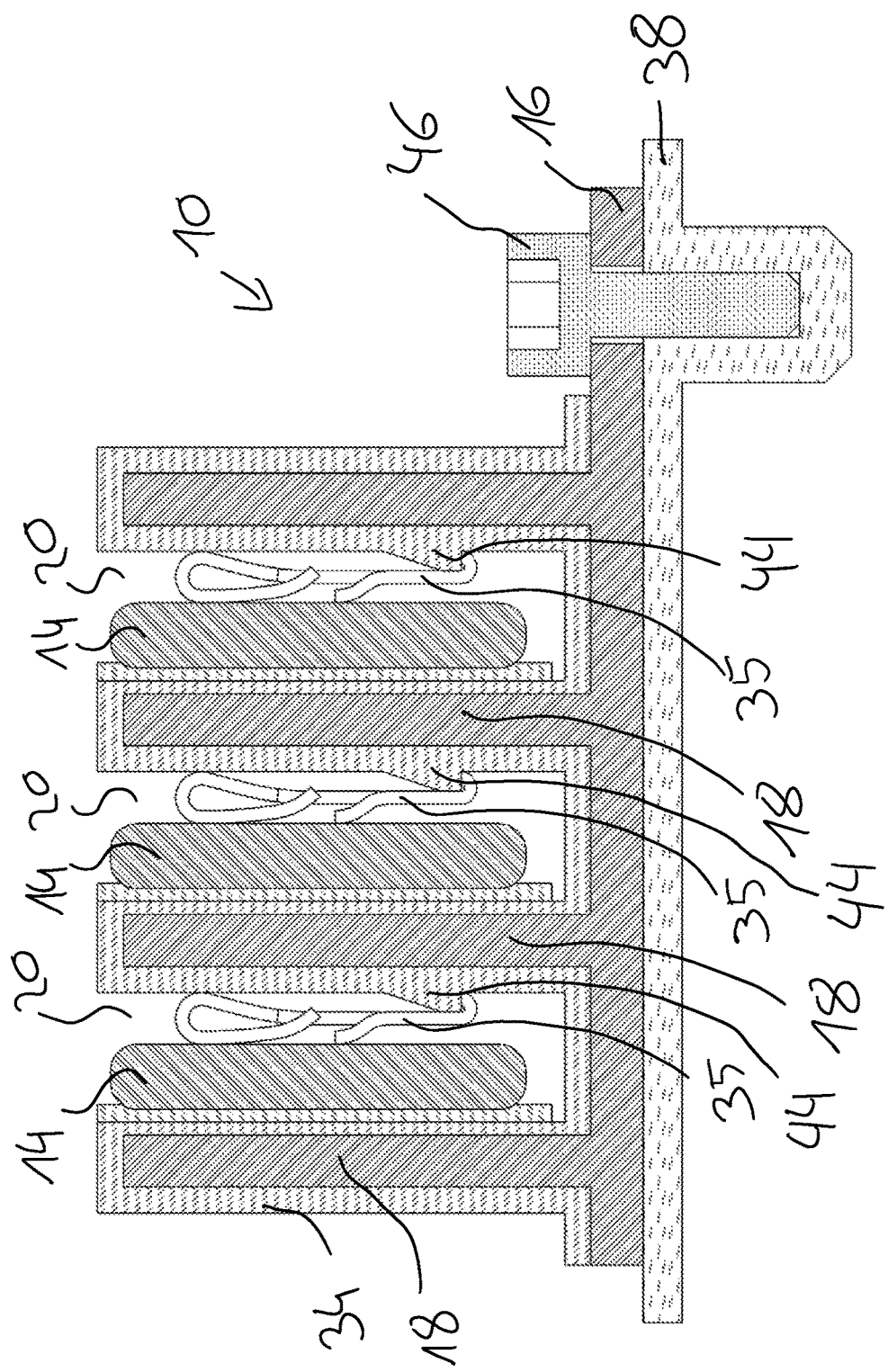
FIG. 3 is a diagrammatic, sectional view of a further embodiment of the busbar assembly according to the invention with fixing elements formed as spring elements and a screw connection to a housing.

Reference is now to be made to FIG. 3.

In contrast to the busbar assembly 10 of FIG. 2, in the busbar assembly 10 of FIG. 3, the fixing element is formed as a spring element 35 which is arranged under pre-tension in the respective receiving space 20, wherein the spring element 35 in turn presses the busbar 14 toward the cooling fins 18. In the concrete example of FIG. 3, the fixing element formed as a spring element 35 is fixed in the receiving space 20 by means of a retaining lug 44 integrated into the insulator 34.

In contrast to the busbar assembly 10 of FIG. 2, in the busbar assembly 10 of FIG. 3, the bottom wall 16 is further secured to the housing wall 38 by means of a screw 46.

Figure 4:
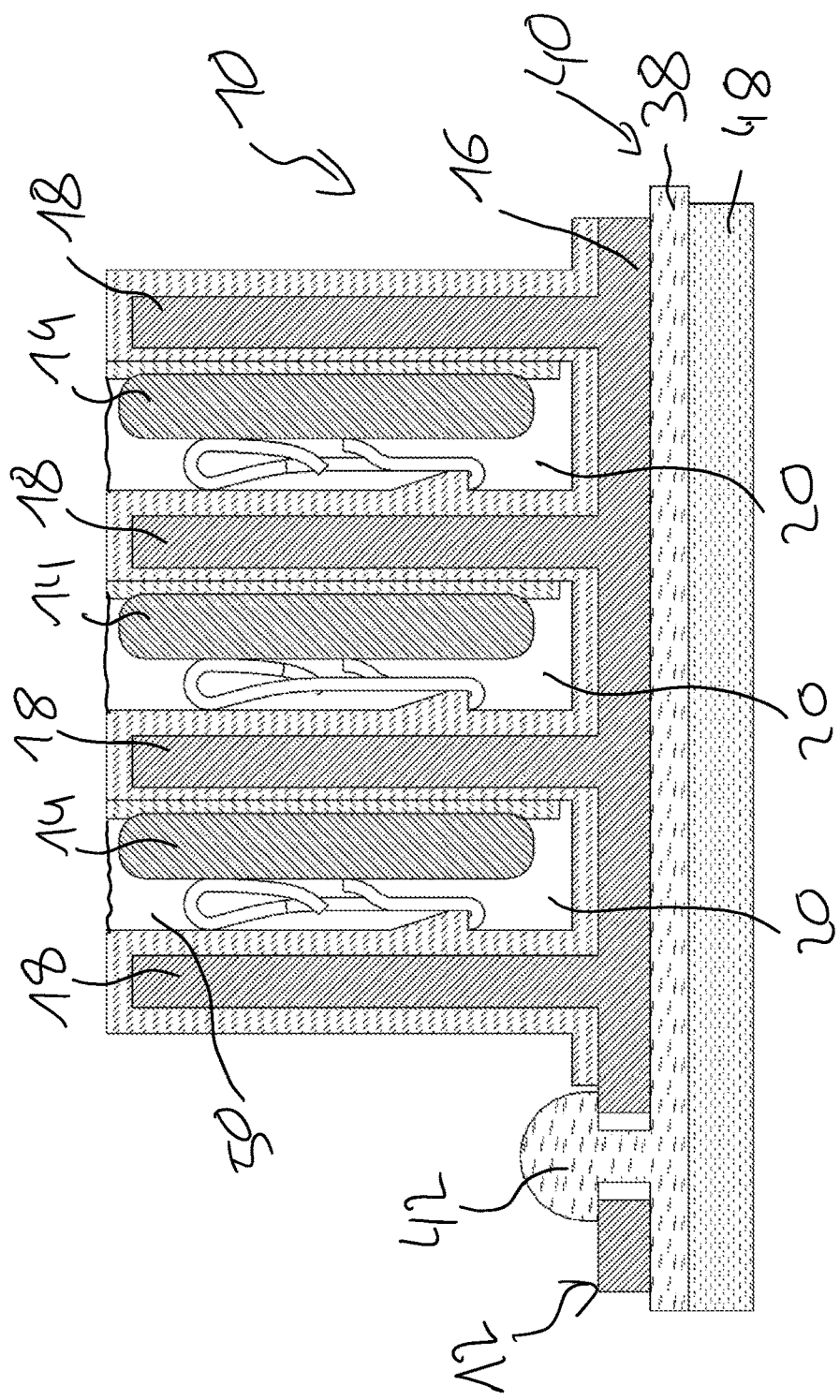
FIG. 4 is a diagrammatic, sectional view of a further embodiment of the busbar assembly according to the invention with a fixing element formed as a spring element and with a heat-caulked connection to a housing.

Reference is now to be made to FIG. 4.

In the concrete example of FIG. 4, the busbar heatsink 12 of the busbar assembly 10 is attached to the housing wall 38 by means of the heat-caulked pin 42. In contrast to the embodiments described so far, in the embodiment of FIG. 4, the housing wall 38 of the housing 40 is also connected to an external housing heatsink 48. In other words, the housing wall 38 is connected to the housing heatsink 48 on a side facing away from the bottom wall 16. The housing heatsink 48 produces a thermal connection to the busbars 14 via the cooling fins 18, the bottom wall 16, and the housing wall 38. This enables even more effective cooling of the busbars 14 as far as an environment outside the housing 40.

In the embodiment of FIG. 4, the receiving spaces 20 are also filled with a potting compound 50. The potting compound 50 improves the heat dissipation of the busbars 14.

Figure 5:
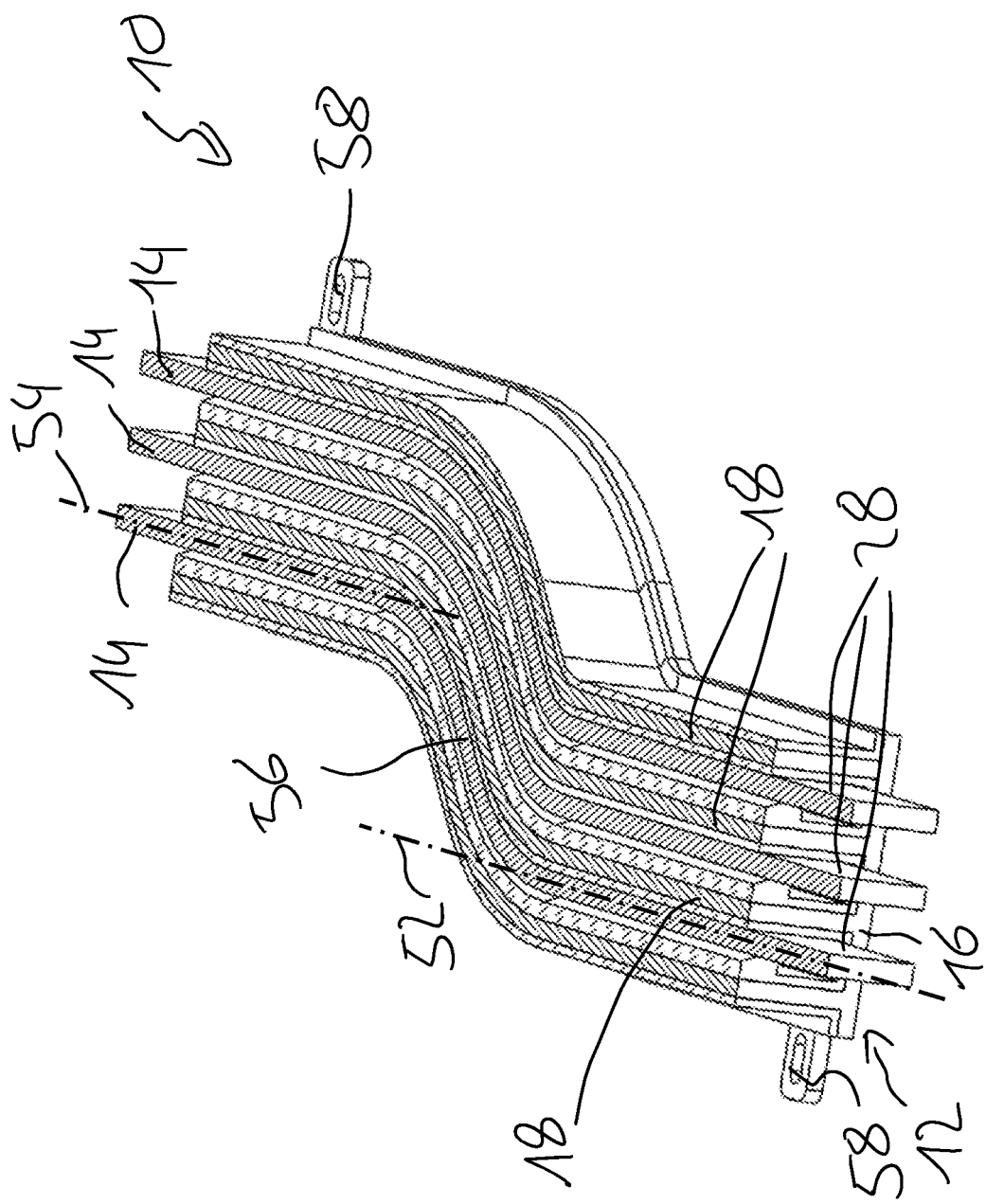
FIG. 5 is a diagrammatic, sectional view of a further embodiment of the busbar assembly according to the invention, in which the longitudinal extension direction of the busbar has a curved profile at least in some sections.

Reference will now be made to FIG. 5, which shows a sectional view through the busbar assembly 10, wherein the busbars 14 in the embodiment of FIG. 5, in particular in the longitudinal extension direction of the busbars 14, are curved at least in some sections. Due to the at least partially curved profile of the busbars 14, which in FIG. 5 is arc-shaped at least in some sections, the busbars 14 are not aligned flush in the longitudinal extension direction, i.e. in the direction of the electrical conduction path. For example, a first portion of the busbars 14 extends along a first axis 52 and a second portion of the busbars 14 extends, for example, along a second axis 54, which is not aligned with the first axis 52 or is arranged a distance apart from it. Between the two linear portions of the busbars 14 there is a curved, arc-shaped portion 56, at least in sections. This curved profile of the busbars 14 makes it possible to adapt a current flow guide, for example, to predefined connection points if present. A parallel arrangement of the two axes 52, 54 is not mandatory.

As can also be clearly seen in FIG. 5, a profile of the cooling fins 18 in the longitudinal extension direction is adapted to the at least partially curved profile of the busbars 14, so that again the side faces 28 are in contact with the cooling fins 18. It is also clearly visible that the plurality of busbars 14 extend parallel to each other so that a stacked arrangement in the horizontal direction of busbars 14 running parallel to each other is achieved.

As also shown in FIG. 5, the bottom wall 16 of the busbar heatsink 12 has alignment slots 58, which are used for aligning the busbar heatsink 12 relative to a housing wall of a housing. This alignment feature can be seen, for example, in FIG. 3 from the gap in the drilled hole for the screw 46, or in FIG. 4 from the gap in the drilled hole for the heat-caulked pin 42. Thus, for example, the busbar heatsink 12 can first be mounted on a housing wall of a housing and then a pin or screw can be passed through the alignment slots 58. The busbars 14 and fixing elements are then inserted. Due to the relatively rigid busbars 14 and the fixing elements, movement of the busbar heatsink 12 relative to the housing wall can occur, wherein the alignment slots 58 here act as floating bearings. As soon as the busbars 14 are inserted into the busbar heatsink 12 together with the fixing elements, the busbar heatsink 12 aligned relative to the housing wall can be attached to the housing wall, for example, by heat-caulking the pin or tightening the screw.

Figure 6:
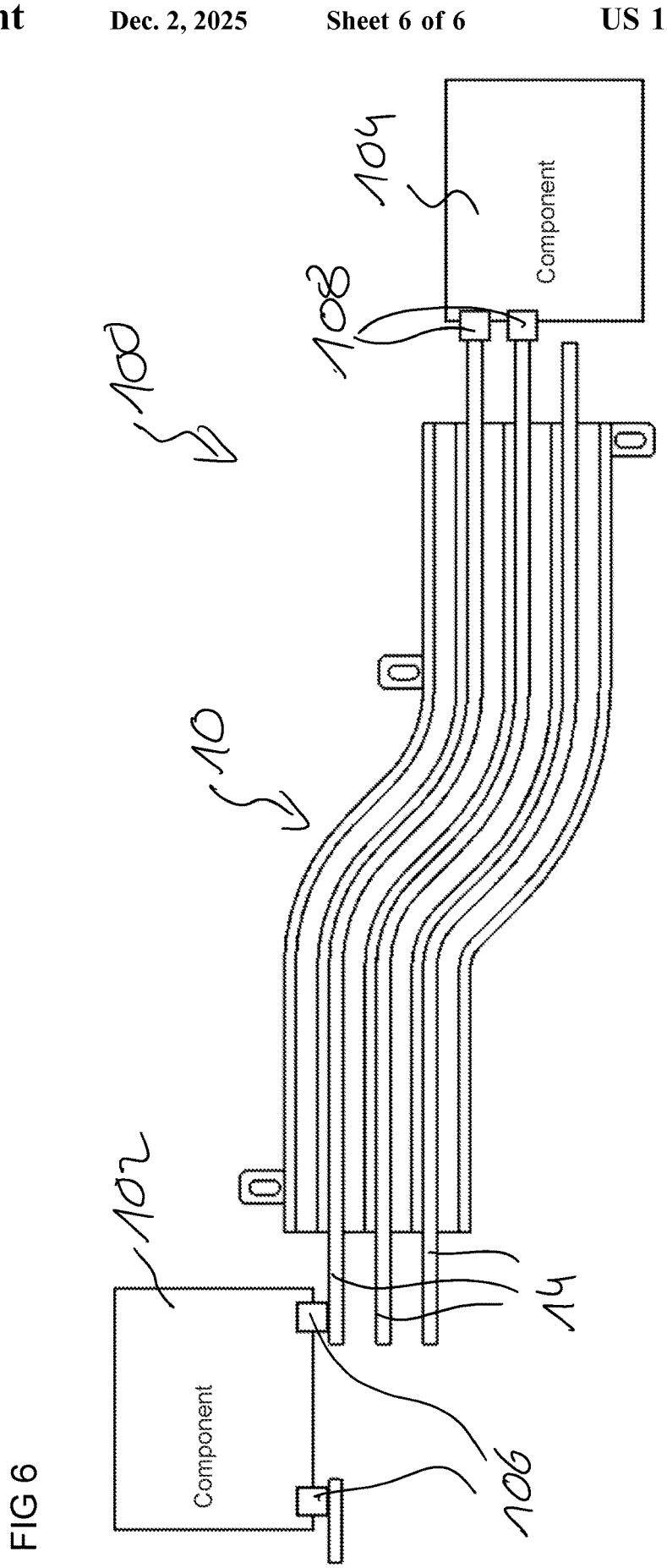
FIG. 6 is a schematic view of an embodiment of the circuit assembly according to the invention, in which the busbar assembly according to the invention electrically connects two electrical components to each other.

Finally, reference is now made to FIG. 6, which shows a circuit assembly 100, wherein the circuit assembly 10 contains, inter alia, the busbar assembly 10 described above as well as a first electrical component 102 and a second electrical component 104. The first electrical component 102 can be, for example, a battery current distributor, and the second electrical component 104 can be, for example, a plug connector, wherein the busbar assembly 10 provides an electrical connection between the two components 102, 104. The first electrical component 102 in the specific example of FIG. 6 has two first electrical connection points 106. The second electrical component 104 in the specific example of FIG. 6 also has two second electrical connection points 108. The busbars 14 are electrically connected on a first section to the first connection points 106 and electrically connected on a second section to the second connection points 108. In the specific example of FIG. 6, the first electrical component 102 is electrically connected to only one busbar 14, whereas the second electrical component 104 is electrically connected to two busbars 14. Of course, in other embodiments not shown, other practical arrangements are conceivable, in which one or more busbars 14 are electrically connected to one or more electrical connection points 106, 108.

Of course, it is conceivable that the different variants and embodiments described in connection with FIGS. 1 to 6 can be combined with each other in any practical manner.

The invention claimed is:

1. A busbar assembly, comprising:
    an electrical busbar having two end faces, a bottom surface, a top surface and two side faces connecting said bottom surface and said top surface; and
    a metallic busbar heatsink having a bottom wall and at least two cooling fins extending from said bottom wall, said cooling fins together with said bottom wall forming a receiving space for receiving said electrical busbar, and said electrical busbar disposed in said receiving space such that at least one of said two side faces of said electrical busbar is in planar contact with one of said cooling fins.

2. The busbar assembly according to claim 1, further comprising an electrical insulator disposed between one of said cooling fins and at least one of said side faces of said electrical busbar in contact with said one cooling fin.

3. The busbar assembly according to claim 2, wherein said electrical insulator is formed from an electrically insulating polymer material applied at least to said cooling fins.

4. The busbar assembly according to claim 1, wherein an air gap is present between said bottom surface of said electrical busbar and said bottom wall of said metallic busbar heatsink.

5. The busbar assembly according to claim 1, further comprising a heat-conducting foil disposed between at least one of said cooling fins and at least one of said side faces of said electrical busbar in contact with said one cooling fin.

6. The busbar assembly according to claim 2, further comprising a fixing element disposed in said receiving space and pushes said electrical busbar laterally toward at least one of said cooling fins and fixes said electrical busbar in position.

7. The busbar assembly according to claim 6, wherein said fixing element is integrated into said electrical insulator.

8. The busbar assembly according to claim 7, wherein said fixing element is formed as a spring element applying a spring force and is installed in said receiving space under pre-tension.

9. The busbar assembly according to claim 1, further comprising a potting compound filling said receiving space.

10. The busbar assembly according to claim 1, further comprising a housing having a housing wall, wherein said bottom wall of said metallic busbar heatsink is connected to said housing wall of said housing.

11. The busbar assembly according to claim 10, wherein said bottom wall has alignment slots formed therein for aligning said metallic busbar heatsink relative to said housing wall.

12. The busbar assembly according to claim 10, further comprising a housing heatsink, wherein said housing wall is connected to said housing heatsink on one side facing away from said bottom wall.

13. The busbar assembly according to claim 1, wherein said electrical busbar has a profile that is curved at least in some sections in a longitudinal extension direction and said cooling fins of said metallic busbar heatsink are matched to said profile, namely being curved in at least some sections.

14. The busbar assembly according to claim 1, wherein:
  said electrical busbar is one of a plurality of electrical busbars; and
  said at least two cooling fins are two of a plurality of said cooling fins, each two of said cooling fins form a respective said receiving space for a respective one of said electrical busbars, and wherein one of said electrical busbars is disposed in each said receiving space of said metallic busbar heatsink such that at least one of said two side surfaces of said respective electrical busbar is in a planar contact with one of said cooling fins.

15. The busbar assembly according to claim 14, wherein said plurality of electrical busbars in said metallic busbar heatsink are disposed next to each other and parallel to each other.

16. A circuit assembly, comprising:
  a first electrical component having a first electrical connection point;
  a second electrical component having a second electrical connection point; and
  a busbar assembly, containing:
    an electrical busbar having two end faces, a bottom surface, a top surface and two side faces connecting said bottom surface and said top surface; and
    a metallic busbar heatsink having a bottom wall and at least two cooling fins extending from said bottom wall, said cooling fins together with said bottom wall forming a receiving space for receiving said electrical busbar, and said electrical busbar disposed in said receiving space such that at least one of said two side faces of said electrical busbar is in planar contact with one of said cooling fins; and
  said electrical busbar is electrically connected to said first connection point on a first section and electrically connected to said second connection point on a second section.

* * * * *